United States Patent
Kirmsze (10) Patent No.: US 11,014,599 B2
(45) Date of Patent: May 25, 2021

(54) ADJUSTABLE STEERING COLUMN FOR A MOTOR VEHICLE, COMPRISING AN ENERGY ABSORPTION DEVICE

(71) Applicants: thyssenkrupp Presta AG, Eschen (LI); thyssenkrupp AG, Essen (DE)

(72) Inventor: Helmut Kirmsze, Schaan (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 16/634,750

(22) PCT Filed: Aug. 8, 2018

(86) PCT No.: PCT/EP2018/071509
§ 371 (c)(1),
(2) Date: Jan. 28, 2020

(87) PCT Pub. No.: WO2019/030285
PCT Pub. Date: Feb. 14, 2019

(65) Prior Publication Data
US 2020/0207403 A1 Jul. 2, 2020

(30) Foreign Application Priority Data
Aug. 10, 2017 (DE) ...................... 10 2017 213 911.0

(51) Int. Cl.
*B62D 1/19* (2006.01)
(52) U.S. Cl.
CPC .................................... *B62D 1/197* (2013.01)
(58) Field of Classification Search
CPC ........ B62D 1/197; B62D 1/195; B62D 1/192; B62D 1/181
See application file for complete search history.

(56) References Cited

U.S. PATENT DOCUMENTS 5,737,971 A * 4/1998 Riefe ..................... B62D 1/181
74/493
5,775,172 A * 7/1998 Fevre ..................... B62D 1/195
188/371

(Continued)

FOREIGN PATENT DOCUMENTS

| JP | 2012180039 A | 9/2012 |
|---|---|---|
| WO | 2017125311 A | 7/2017 |

OTHER PUBLICATIONS

English Translation of International Search Report issued in PCT/EP2018/071509, dated Nov. 29, 2018.

*Primary Examiner* — Frank B Vanaman
(74) *Attorney, Agent, or Firm* — thyssenkrupp North America, LLC (57) ABSTRACT

An adjustable steering column includes an actuating unit for rotatably mounting a steering shaft, a carrying unit in which the actuating unit is mounted so as to be axially displaceable via a motorized longitudinal adjustment drive, a transmission device coupled to the actuating unit and to the longitudinal adjustment drive, an energy absorption apparatus for absorbing energy when the actuating unit moves relative to the transmission device, and a coupling device connected to the actuating unit and to the transmission device. The coupling device may be disconnected from the actuating unit and/or the transmission device in a crash event, allowing movement between the actuating unit and the transmission device. The coupling device may have a pin-shaped holding element that protrudes into a slot. A blocking element may block movement of the holding element in the slot, and in a crash event permit movement of the holding element in the slot.

16 Claims, 5 Drawing Sheets

(56) References Cited

U.S. PATENT DOCUMENTS

| | | | | |
|---|---|---|---|---|
| 5,979,860 A * | 11/1999 | Jurik | ............ | B62D 1/195 |
| | | | | 188/371 |
| 6,378,903 B1 * | 4/2002 | Yabutsuka | ............ | B62D 1/195 |
| | | | | 188/371 |
| 9,187,116 B2 | 8/2015 | Yokota | | |
| 2005/0167962 A1 * | 8/2005 | Sato | ............ | B62D 1/187 |
| | | | | 280/775 |
| 2006/0033321 A1 | 2/2006 | Manwaring | | |
| 2008/0100050 A1 * | 5/2008 | Menjak | ............ | B62D 1/195 |
| | | | | 280/777 |
| 2008/0229867 A1 | 9/2008 | Waibel | | |
| 2015/0135882 A1 * | 5/2015 | Rauber | ............ | B62D 1/181 |
| | | | | 74/493 |
| 2015/0232117 A1 | 8/2015 | Stinebring | | |
| 2016/0046318 A1 | 2/2016 | Stinebring | | |
| 2016/0212920 P1 | 7/2016 | Randag | | |
| 2016/0257333 A1 * | 9/2016 | Ku | ............ | B62D 1/181 |
| 2016/0368524 A1 | 12/2016 | Tinnin | | |
| 2018/0244300 A1 | 8/2018 | Abou Alam | | |
| 2018/0265116 A1 | 9/2018 | Sulser | | |
| 2018/0281841 A1 | 10/2018 | Kurz | | |
| 2018/0290681 A1 | 10/2018 | Schädlich | | |
| 2018/0354546 A1 | 12/2018 | Kreutz | | |
| 2019/0232997 A1 | 8/2019 | Domig | | |

* cited by examiner

ADJUSTABLE STEERING COLUMN FOR A MOTOR VEHICLE, COMPRISING AN ENERGY ABSORPTION DEVICE

CROSS REFERENCE TO RELATED APPLICATIONS

This application is a U.S. National Stage Entry of International Patent Application Serial Number PCT/EP2018/071509, filed Aug. 8, 2018, which claims priority to German Patent Application No. DE 10 2017 213 911.0, filed Aug. 10, 2017, the entire contents of both of which are incorporated herein by reference.

FIELD

The present disclosure generally relates to steering columns, including adjustable steering columns with energy absorption devices.

BACKGROUND

A steering column having an energy absorption apparatus is known from US 2015/023 2117 A1. In the case of the known steering column, a coupling element which is arranged in terms of action between the longitudinal adjustment drive and the energy absorption apparatus is additionally fastened to the actuating unit by means of rivets. The rivets serve as a bypass for the adjusting forces, in order that, in normal operation, the adjusting forces are not transmitted via the energy absorption apparatus to the actuating unit, which might impair the function of the energy absorption apparatus. If, in the case of a vehicle crash, however, the actuating unit experiences a pronounced axial force in the direction of the vehicle front as a consequence of high impact energy, the riveted connections to the fixed coupling element shear off, with the result that an axial displacement occurs between the actuating unit and the coupling element, which axial displacement is braked with the aid of the energy absorption apparatus. The known steering column has the disadvantage that the braking force for shearing off the riveted connections cannot be set precisely to the requirements.

Thus a need exists for a steering column which, in the case of a vehicle crash, brakes with a defined braking force.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, the present disclosure generally relates to an adjustable steering column for a motor vehicle. In some examples, such an adjustable steering column may include an actuating unit for mounting a steering shaft such that it can be rotated about a longitudinal axis, and a carrying unit, in which the actuating unit is mounted such that it can be displaced axially in the direction of the longitudinal axis of the steering shaft by means of a motorized longitudinal adjustment drive which is arranged on the carrying unit, and comprising, furthermore, a transmission device which is coupled on one side to the actuating unit and is coupled on the other side to the longitudinal adjustment drive, an energy absorption apparatus being provided which absorbs energy in the case of a displacement of the actuating unit with respect to the transmission device, a coupling device being provided which is connected to the actuating unit and which is connected to the transmission device, the connection of the coupling device to the actuating unit and/or the transmission device being canceled in the case of a crash, in the case of which a force which exceeds a predefined value acts on the steering shaft in the direction of the longitudinal axis, with the result that a movement is made possible between the actuating unit and the transmission device.

It is provided according to the invention that the coupling device has a pin-shaped holding element which protrudes into a slot, a blocking element being provided which blocks the movement of the holding element in the slot and, in the case of a crash, releases the movement of the holding element in the slot.

Here, the longitudinal axis of the steering spindle coincides with the rotational axis of the steering spindle and is used synonymously.

By way of the configuration of the blocking element in relation to the shape, the arrangement, the material and further design features, a respective desired braking force can be set, the movement of the actuating unit with respect to the transmission device being made possible in the case of said braking force being exceeded. In this case, the case of a crash, the energy absorption apparatus can use energy which is introduced into the displacement. In the case where the braking force is not exceeded, that is to say a force which lies below the respective desired limit for the braking force acts on the steering shaft, the movement of the actuating unit with respect to the transmission device is blocked. Said driving state represents the normal state during driving operation of the motor vehicle.

In the case of a crash, the connection of the coupling device to the actuating unit is preferably canceled. It is conceivable and possible, however, for the connection of the coupling device to the transmission device to be canceled in the case of a crash.

It can preferably be provided that the slot of the coupling device is arranged in a front end section of a coupling element, which front end section faces the vehicle front, and in the process is oriented axially parallel to the longitudinal axis and is preferably configured so as to be open toward the front. In this embodiment, the pin-shaped holding element is connected fixedly to the actuating unit, projects from the latter in the radial direction, and protrudes through the slot. In the normal state, the blocking element prevents the axial sliding of the holding element in the slot. In the preferred form with the slot which is open toward the front, sliding out of the open end of the slot, in particular, is also prevented by way of the blocking element in the normal state. In the case of a crash, however, the blocking action of the blocking element is canceled, and the relative movement is accordingly made possible.

The solution according to the invention has the advantage that it is not the holding element itself which has to be broken out from its anchoring. In the case of the invention, the blocking element assumes said task. After breaking through the blockade which is brought about by way of the blocking element, the holding element itself can continue its path through the slot in an unimpeded manner, in one preferred case even until it slides out of the open front end section of the slot. The blocking element can advantageously be configured in relation to its shape and its material in such a way that a predefined force is required for overcoming the blockade.

One advantageous refinement of the invention provides that the pin-shaped holding element is configured as a rivet or a screw. These are simple and inexpensive standard components which can be fastened to the actuating unit in a known way.

In one advantageous refinement, the actuating unit has a bore for fastening the rivet or a threaded bore for screwing in the screw.

In accordance with one preferred embodiment of the invention, the blocking element is formed by way of a projection of the coupling element, which projection protrudes into the slot. In this case, the projection is already part of the coupling element and is connected fixedly to the latter. Special fastening of the blocking element to the coupling element is not required in this embodiment.

Said projection is advantageously introduced by way of punching into the coupling element together with the slot. The projection then limits the movement of the pin-shaped holding element in the slot. It can be provided here that the projection is deformed even further, with the result that it encloses the rivet or the screw in an arcuate manner.

In a further advantageous embodiment, the blocking element consists of a plastic bar which extends transversely over the slot and is anchored in two lateral recesses of the slot walls, which lateral recesses are arranged so as to lie opposite one another. Said embodiment is particularly suitable for the adaptation of the braking force to the requirements, since the plastic bar can firstly be of more or less thick configuration, and can secondly consist of various plastics with different breaking properties.

The prefabricated plastic bar will preferably be pressed into a corresponding cutout in the slot. It is also conceivable and possible, however, to mold the plastic bar directly into the recesses of the slot walls. Here, the plastic bar is not only generated by means of injection molding, but rather is also mounted at the same time.

In one preferred refinement of the invention, in the case of a crash, the connection of the coupling device to the actuating unit is canceled, and the energy absorption apparatus has at least one bending wire, the first end of which is connected to the actuating unit, and the second end of which is connected to the coupling device. If, in the case of a vehicle crash, the actuating unit is displaced axially with respect to the coupling device which is fixed on the carrying unit, the bending wire is bent, absorbing part of the impact energy and braking the axial displacement of the actuating unit. In a further advantageous refinement, the energy absorption apparatus has a second bending wire, the first end of which is connected to the actuating unit, and the second end of which is connected to the coupling device via a switching connection which can be released by means of a pyrotechnical switch. If the switching connection is switched on, the actuating unit is connected to the two bending wires in the case of a vehicle crash, with the result that the two bending wires are bent and absorb impact energy. This leads to more pronounced braking of the actuating unit than in the first case, where only one bending wire was activated. Should a central control unit of the vehicle determine, however, that a smaller braking action would be more advantageous on account of certain circumstances, it actuates the pyrotechnical switch, the connection between the second bending wire and the coupling device being interrupted. As a consequence, only the first bending wire is bent, and the energy which is absorbed overall is halved. The consequence is a smaller braking action of the actuating unit.

As an alternative, it is possible that, in the case of a crash, the connection of the coupling device to the transmission device is canceled, the energy absorption apparatus having at least one bending wire, the first end of which is connected to the transmission device, and the second end of which is connected to the coupling device. If, in the case of a vehicle crash, the actuating unit is displaced axially with respect to the coupling device which is fixed on the carrying unit, the bending wire is bent, absorbing part of the impact energy and braking the axial displacement of the actuating unit. Two bending wires can also be provided accordingly, in an analogous manner to the abovementioned embodiment.

It is provided in a further advantageous embodiment of the invention that the longitudinal adjustment drive has a spindle drive with a spindle nut which can be displaced axially on a spindle, and that a transmission element which is connected to the spindle nut together with the coupling element, is configured as a single-piece integral component. As a result, the number of components and the associated assembly costs are reduced.

Figure 1:
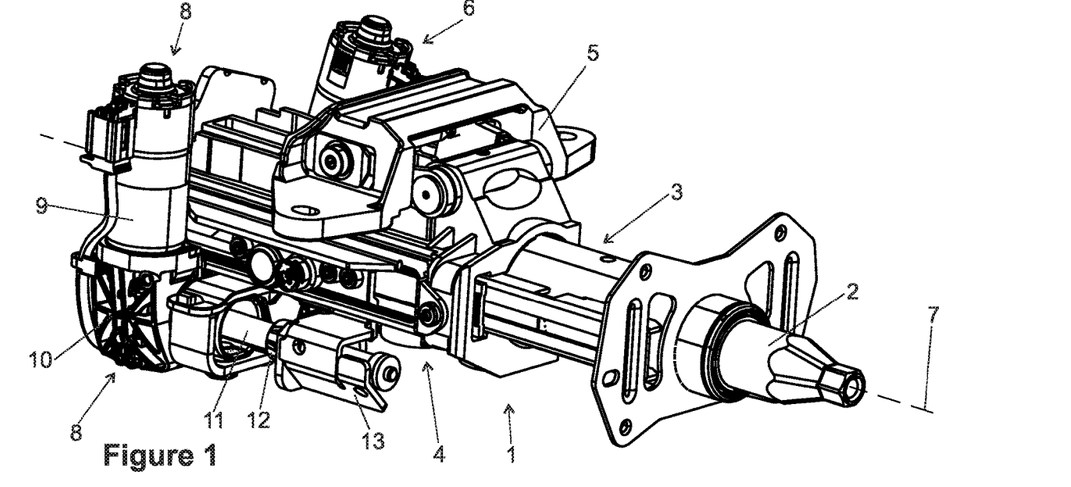
FIG. 1 is a perspective view of an example steering column in a state ready for installation.

An electrically adjustable steering column for a motor vehicle comprises a steering shaft 2 which is mounted in an actuating unit 3 such that it can be rotated about a longitudinal axis 7. For its part, the actuating unit 3 is mounted on the carrying unit 4 such that it can be displaced along the longitudinal axis 7. In the example, the carrying unit 4 is in turn mounted pivotably in a holder 5 which is connected fixedly to the vehicle chassis (not shown), as a result of which a height adjustment of the steering shaft 2 is made possible. Here, however, the invention can also be applied to steering columns which cannot be height-adjusted.

For the height adjustment, an electric height adjustment drive 6 is provided which is not described further here.

Figure 2:
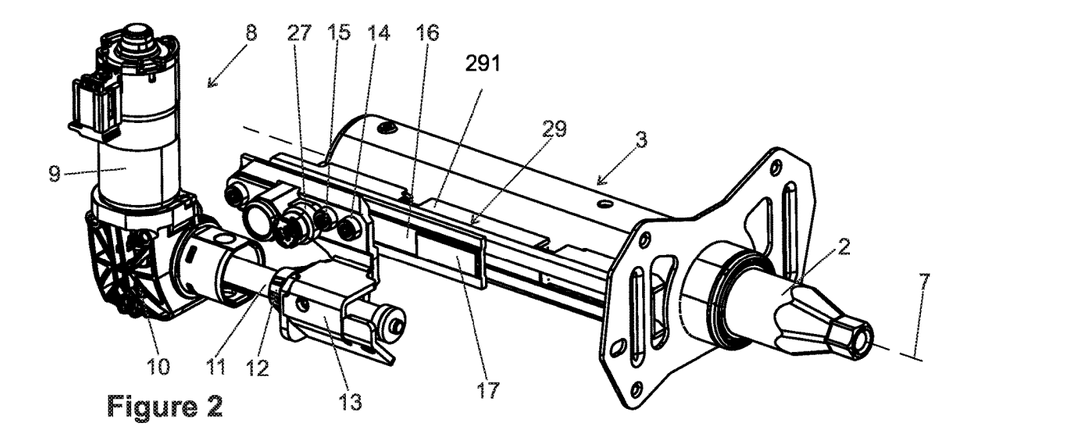
FIG. 2 is a perspective view of an example actuating unit of the steering column from FIG. 1 in conjunction with a longitudinal adjustment drive.
Figure 4:
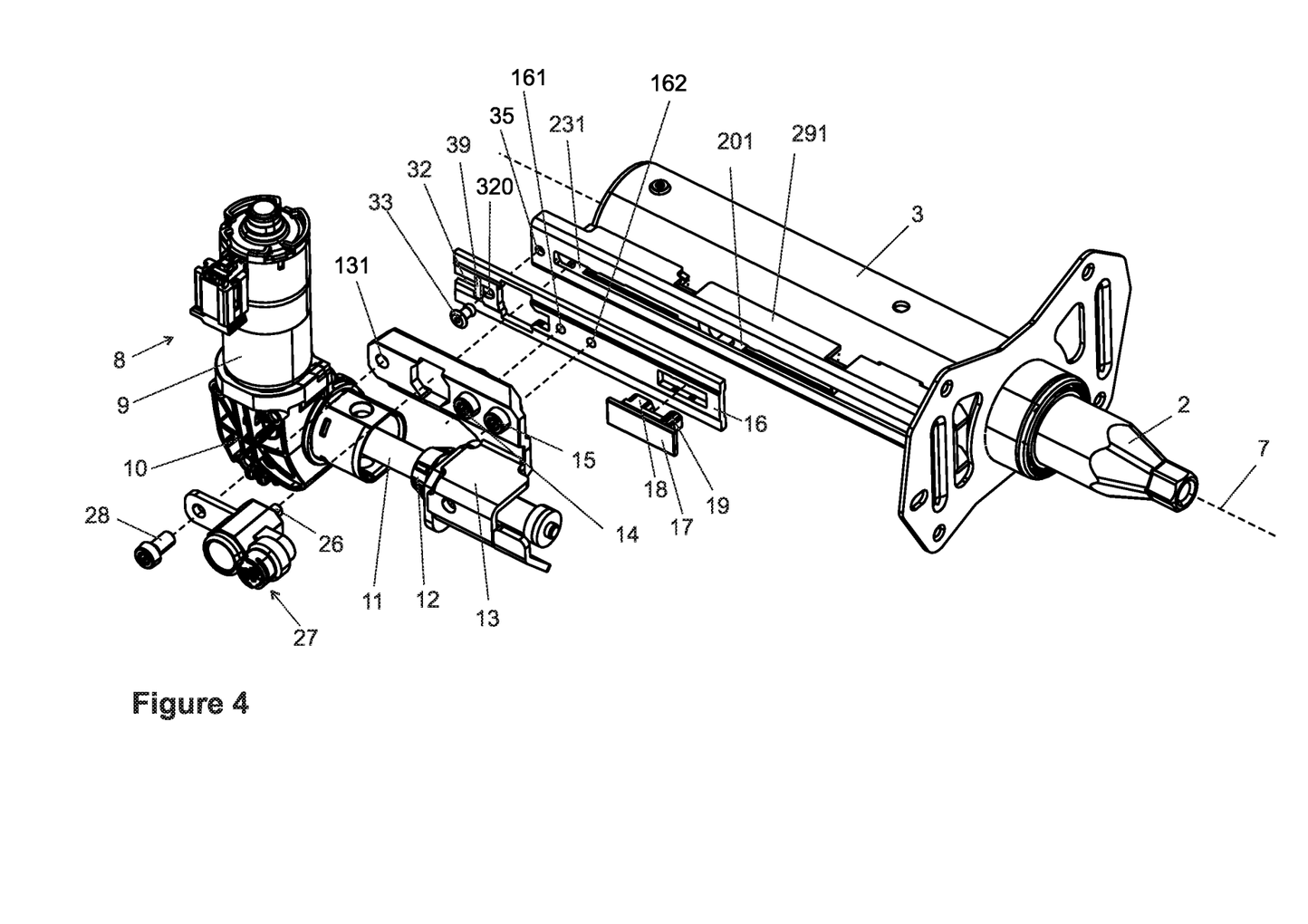
FIG. 4 is an exploded view of the actuating unit with a longitudinal adjustment drive.
Figure 5:
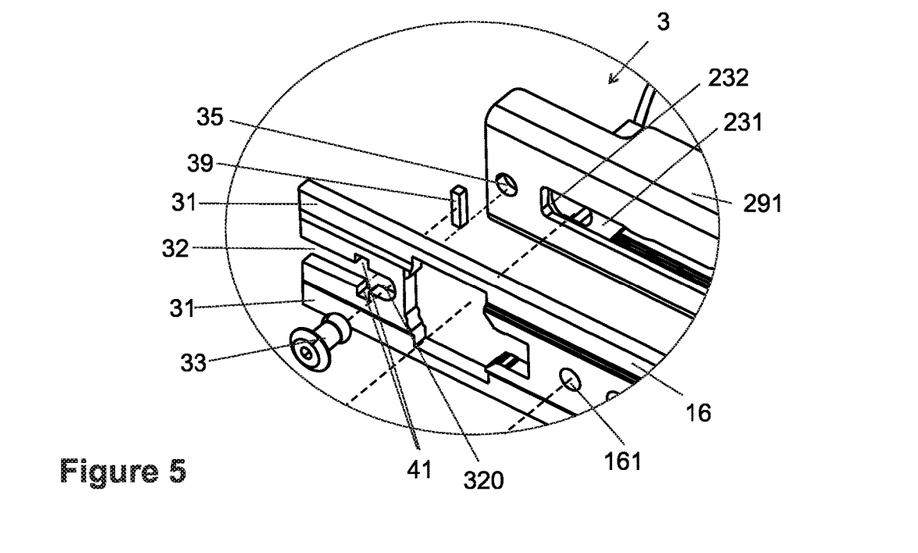
FIG. 5 is an enlarged detail view from FIG. 4.
Figure 6:
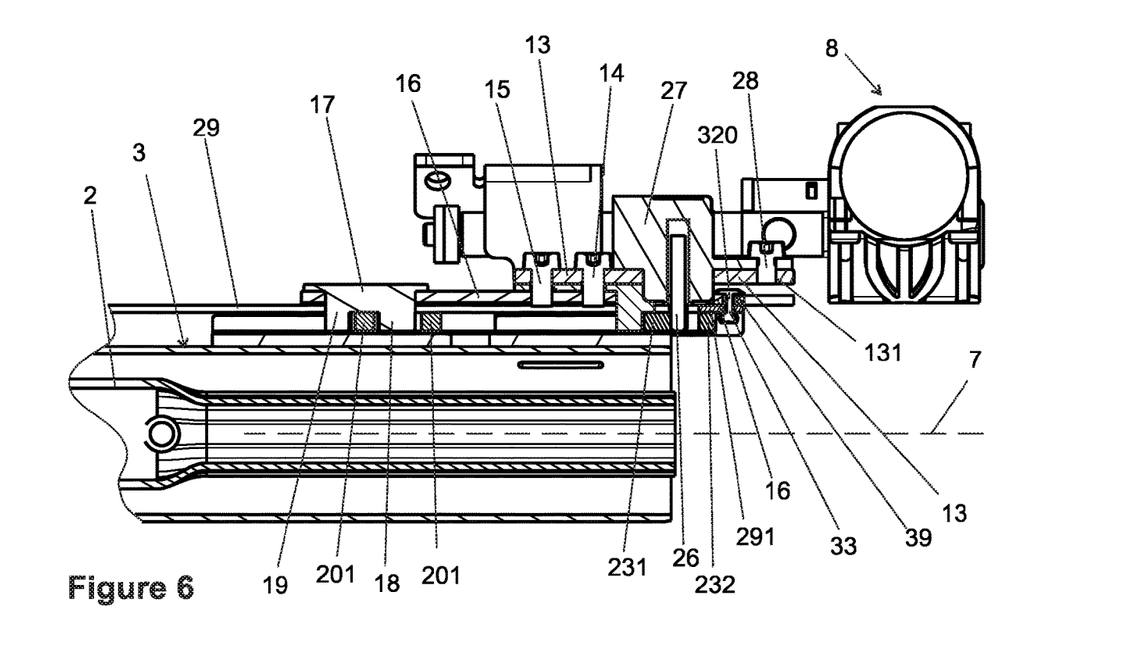
FIG. 6 is a top sectional view of the actuating unit with a longitudinal adjustment drive.

An electric longitudinal adjustment drive 8 is arranged on the carrying unit 4. The longitudinal adjustment drive 8 has an electric motor 9 and a gear mechanism 10 which is connected to a spindle 11. The electric motor 9 drives the spindle 11 via the gear mechanism 10. The spindle 11 is oriented along the longitudinal axis 7. A spindle nut 12 is seated on the spindle 11, which spindle nut 12 can be displaced to and fro along the longitudinal axis 7 by way of rotation of the spindle 11 by means of the electric motor 9. The spindle nut 12 is connected to the transmission device in the form of a transmission element 13 which is screwed by means of two fastening screws 14, 15 in bores 161 and 162 to a coupling element 16 of the coupling device, which coupling element 16 is oriented in the direction of the longitudinal axis 7. A plug-in part 17 is fastened to the coupling element 16, which plug-in part 17 has two fixing elements 18, 19 which are oriented in the radial direction transversely with respect to the longitudinal axis 7 and, between them, receive a round end 21 of a first bending wire 20, which round end 21 is bent over by approximately 270°.

Figure 3:
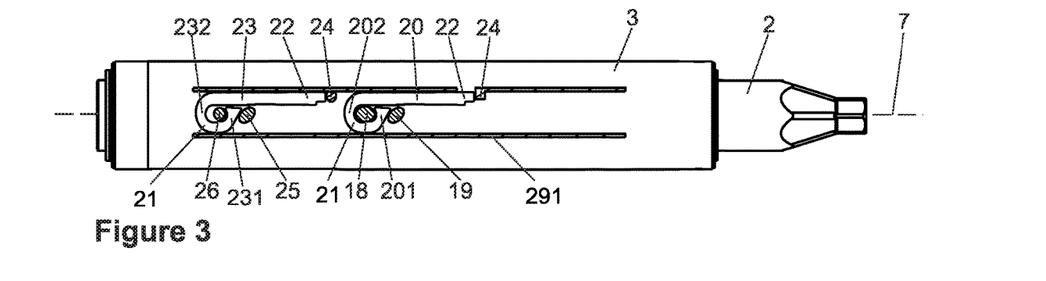
FIG. 3 is a side view of the actuating unit with an energy absorption apparatus.

As is seen most clearly in FIG. 3, the actuating unit 3 is equipped with two bending wires 20, 23 which in each case have a first, straight end 22 and a second, round end 21. The straight ends 22 bear in each case against a stop 24 of the actuating unit 3. The stops 24 ensure that, in the case of a displacement of the actuating unit 3 as a consequence of a vehicle crash, the respective straight ends 22 of the bending wires 20, 23 are moved together with the actuating unit 3. Here, the fastening section 201 of the round end 21 of the first bending wire 20 remains between the two fixing elements 18, 19 on the coupling device and therefore on the coupling element 16, and is therefore fixed such that it cannot be moved with respect to the carrying unit 4, with the result that the first bending wire 20 is bent in the respective bending section 202 and in the process absorbs impact energy.

In the illustration of FIG. 3, the fastening section 231 of the round end 21 of the second bending wire 23 is likewise clamped in between two fixing elements 25, 26, only the one fixing element 25 being installed fixedly, however. The other fixing element 26 is configured as a movable fixing element. It has the form of a pin which protrudes out of a pyrotechnic switch 27. The pyrotechnic switch 27 is mounted on the transmission element 13 and is fastened by means of a fastening screw 28.

In the case of a vehicle crash, there are then two possibilities:

If the movable fixing element 26 is in the position which is shown in the figure, the fastening section 231 of the second bending wire 23 is clamped in and fixed between the fixing elements 25, 26. This means that the actuating unit 3 which is displaced to the left along the longitudinal axis 7 in the case of a vehicle crash bends the two bending wires 20, 23, a greater part of the impact energy being absorbed, which greater part is required for bending two bending wires 20, 23.

If, in the other case, a central control electronics system (not shown) decides on the basis of evaluated sensor inputs that less impact energy is to be absorbed, it actuates the pyrotechnic switch 27 which, thereupon, moves the movable fixing element 26 out of engagement with the second bending wire 23 in fractions of a second. In the case of a displacement of the actuating unit 3 to the left, the second bending wire 23 is merely also displaced, without being bent, however. Impact energy is absorbed solely in the first bending wire 20, as a result of which the quantity of absorbed energy is lower than in the first case.

Even if, in the exemplary embodiment which is shown, the transmission element 13 and the coupling element 16 are shown as two separate components which are screwed to one another by means of the fastening screws 14, 15, it can be advantageous with regard to a less complex assembly for the transmission element 13 and the coupling element 16 to be configured as a single-piece integral component.

By way of their stops 24 on the actuating unit 3 and the guide rail 291 and their fixing elements 18, 19, 25, 26 and the pyrotechnic switch 27, the bending wires 20, 23 form a switchable energy absorption apparatus 29 which, depending on the requirement of the respective crash situation, can absorb two different part quantities of the impact energy.

In order to avoid the adjusting forces which are transmitted from the carrying unit 4 to the actuating unit 3 by way of the longitudinal adjustment drive 8 for the longitudinal adjustment not being transmitted via the energy absorption apparatus 29, and in order to avoid an impairment of the function of the energy absorption apparatus 29, which impairment is due to this, breaking of the connection between the coupling device and the actuating unit and/or breaking of the connection between the coupling device and the transmission device are/is provided, which can be realized in various embodiments.

As a consequence of the self-locking spindle drive 11, 12, the transmission element 13 which is connected fixedly to the coupling element 16 can no longer be displaced on the spindle 11 in the direction of the longitudinal axis 7 by way of the spindle nut 12 at a standstill of the electric motor 9 and the spindle 11. With the aid of the coupling device, in normal operation, the actuating unit 3 is also connected fixedly via the coupling element to the transmission device and therefore via the further force flow to the carrying unit, and therefore can be displaced just as little in the direction of the longitudinal axis 7. In the case where a force which exceeds a predefined magnitude acts on the steering spindle 2, that is to say in the case of a crash, the connection is broken, however, with the result that the actuating unit 3 is displaced relative to the coupling element 16 in the direction of the longitudinal axis 7, part of the impact energy being absorbed by way of the energy absorption apparatus 29. In the example, the connection between the coupling element 16 and the transmission element 13 is disconnected to this end.

Figure 11:
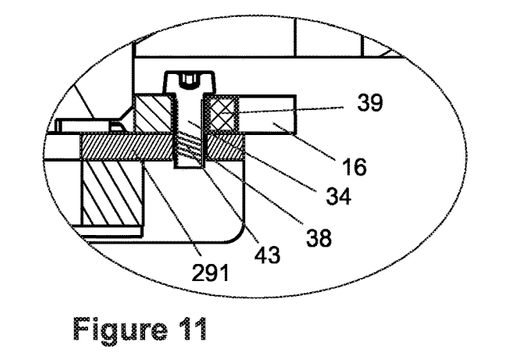
FIG. 11 is an enlarged detail view similar to FIG. 7, but in another example with a holding element in the form of a screw that is screwed into a threaded bore of the actuating unit.
Figure 12:
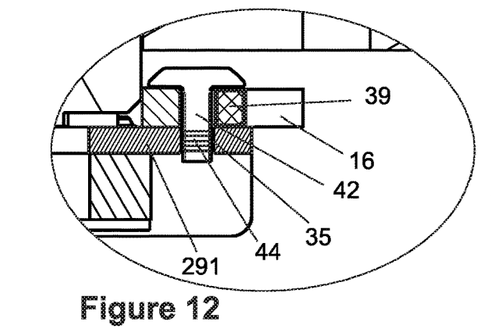
FIG. 12 is an enlarged detail view similar to FIGS. 7 and 11, but in yet another example, in the case of which the holding element is configured as a press-in peg that is anchored in the actuating unit, and the blocking element is configured as a bent-over section of the coupling element.

In the example, in order to realize a function of this type, the coupling element 16 is provided on its end section which faces the vehicle front with an axially oriented slot 32 which is open to the front and through which a pin-shaped holding element 33, 34 protrudes transversely. The holding element can be configured as a rivet 33 or as a screw 34 or as a press-in peg 42. In accordance with FIGS. 1 to 10, it is connected fixedly to the actuating unit 3 by the rivet 33 protruding through a bore 35 in a rail 291 which is connected fixedly to the actuating unit 3, and by being anchored at the outlet of the bore 35 by means of a thickened end 36. At its other end, the rivet 33 is provided with a rivet head 37 which bears against the opposite side of the coupling element 16 and protrudes laterally partially beyond the slot 32. In the case of one alternative embodiment as illustrated in FIG. 11, a screw 34 with a thread 43 is screwed into a threaded bore 38 of the rail 291. In a further alternative preferred embodiment, a press-in peg 42 with a knurled portion 44 is pressed into a bore 35 in the rail 291, as illustrated in FIG. 12.

In order to prevent a movement of the holding element 33, 34, 42 in the slot 32, in particular in order to prevent the respective holding element 33, 34, 42 sliding out of the slot 32, a blocking element 39, 40 is provided which releases the movement after the respective predefined force is exceeded.

In a first embodiment as illustrated in FIGS. 1 to 12, the blocking element is configured as a plastic bar 39 which is anchored in two lateral recesses 41 of the slot 32 and extends transversely over the slot 32. During the manufacture, the malleable plastic material of the plastic bar 39 is pressed into the recesses 41 of the walls of the slot 32.

Figure 7:
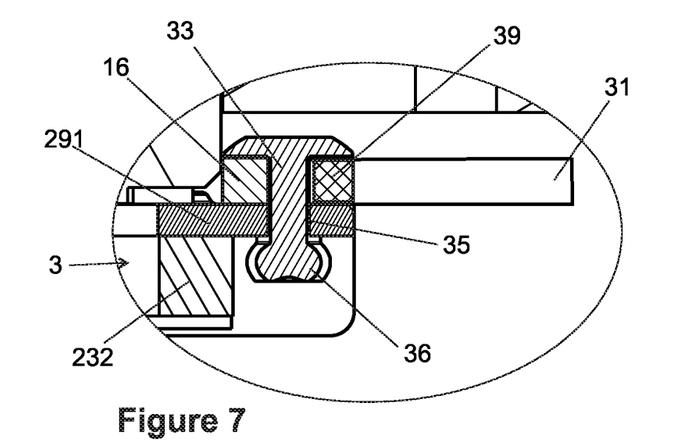
FIG. 7 is an enlarged detail view from FIG. 6 of a coupling element that is fastened by way of rivet to the actuating unit, with a blocking element in the form of a plastic bar in an intact state.
Figure 8:
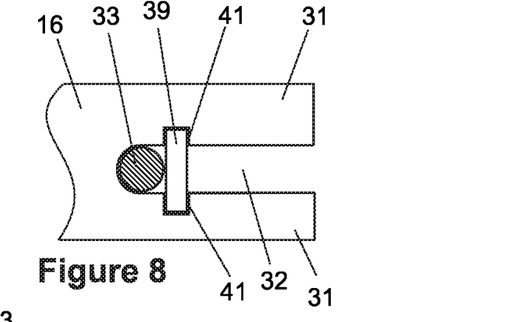
FIG. 8 is a sectional view of the coupling element with a holding element and the blocking element from FIG. 7, but in a viewing direction which is rotated by 90°.

On the basis of two sectional planes which lie orthogonally on one another, FIGS. 7 and 8 show the system in the normal state, in the case of which the adjusting forces which occur in the direction of the longitudinal axis 7 are transmitted from the longitudinal adjustment drive 8 via the coupling element 16 and the holding element which is configured as a rivet 33 to the rail 291 and therefore to the actuating unit 3. A corresponding situation is shown in FIG. 11 with the difference that the coupling element is configured here as a screw 34. FIG. 12 shows a corresponding situation, in the case of which the coupling element is shown as a press-in peg 42 which is pressed into the bore 35. In the cases which are mentioned, the blocking element which is configured as a plastic bar 39 prevented a relative displacement between the coupling element 16 and the actuating unit 3.

Figure 9:
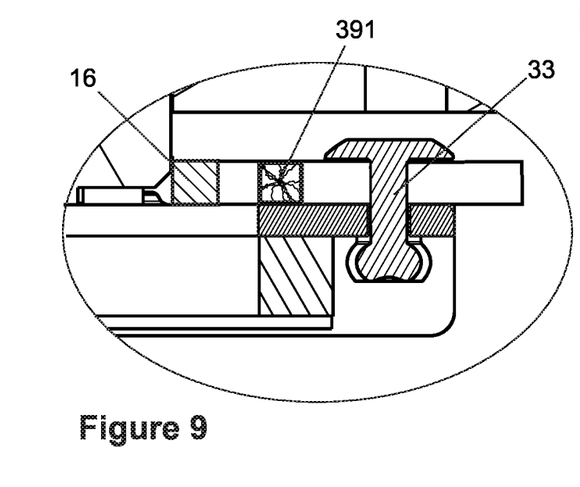
FIG. 9 is an enlarged detail view from FIG. 7 after the blocking element has broken off in the case of a crash event.
Figure 10:
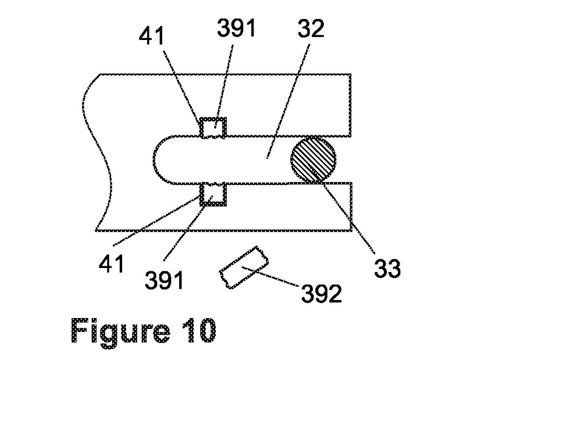
FIG. 10 is a sectional view similar to FIG. 8, but after the blocking element has broken off.

FIGS. 9 and 10 show the situation after a vehicle crash. The actuating unit 3 has been displaced to the right along the longitudinal axis 7 and in the process has also driven the holding element which is configured as a rivet 33. Here, the rivet 33 has broken the plastic bar 39, pieces 391 of the plastic bar 39 having remained in the anchoring 41, and a further piece 392 of the plastic bar falling out of the steering column and approaching the open end of the slot 32 which it will subsequently leave completely. Here, the plastic bar 39 is constructed with regard to its material thickness and the properties of the plastic material in such a way that it breaks in the case of a predefined axial force and releases the holding element 33, 34. It is also conceivable to introduce predetermined break points into the plastic bar which influence the breaking situation in a targeted manner.

Figure 13:
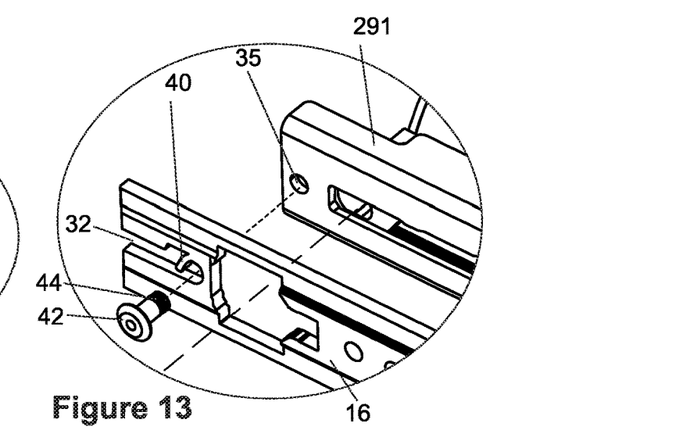
FIG. 13 is a perspective enlarged detail view of the example in FIG. 12.
Figure 14:
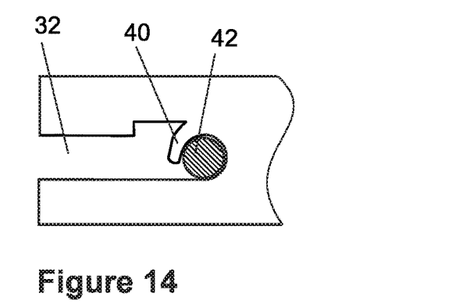
FIG. 14 is an enlarged side view of the example in FIG. 12 in a normal operating state.
Figure 15:
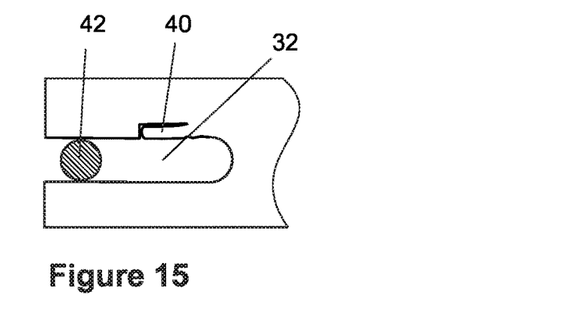
FIG. 15 is an enlarged view similar to FIG. 14, but in a broken-off state as a consequence of a vehicle crash (in a crash state).

Another embodiment is shown in FIGS. 13 to 15. Here, the holding element consists of a press-in peg 42. The blocking element 40 is configured as a projection 40, however, which protrudes into the interior of the slot 32 and thus prevents the press-in peg 42 from being pushed out axially. The projection 40 can be produced in a simple way by way of a punched-out portion in the coupling element 16, preferably together with the slot 32. The situation which is shown in FIG. 14 shows the normal state. The situation which is shown in FIG. 15 shows the state after a vehicle crash when the high impact forces displace the actuating unit 3 and, with it, the press-in peg 42 to the left in the direction of the longitudinal axis 7. Here, the forces are so great that the projection 14 is bent in the direction of the wall of the slot 32. Here, the thickness and the material of the projection 40 determine the axial force which is required to break the connection.

Figure 16:
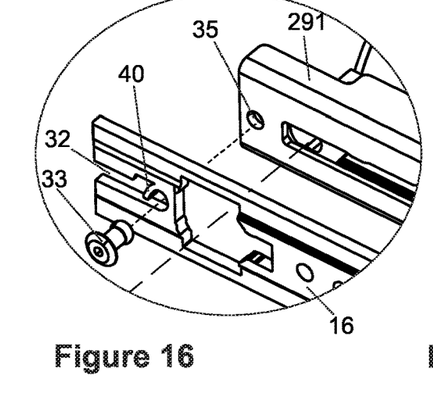
FIG. 16 is a perspective enlarged detail view of still another example, in the case of which the holding element is configured as a rivet that is anchored in an actuating unit, and a blocking element is configured as a bent-over section of a coupling element.

FIG. 16 illustrates the arrangement as shown in FIG. 13, but the holding element is represented by way of a rivet 33.

Figure 17:
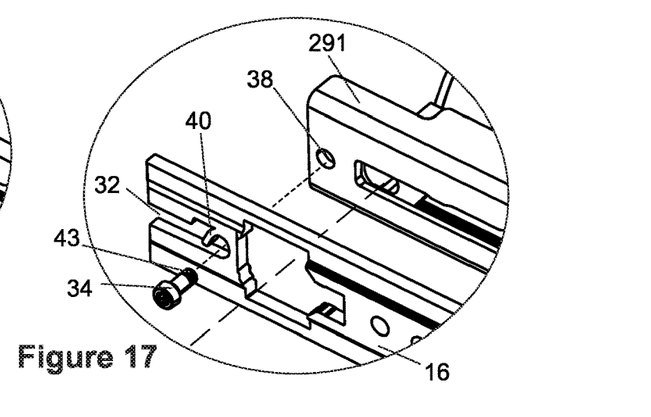
FIG. 17 is a perspective enlarged detail view of the example of FIG. 16, in the case of which the holding element is configured as a screw that is anchored in the actuating unit, and the blocking element is configured as a bent-over section of the coupling element.

FIG. 17 illustrates the arrangement as shown in FIG. 13, but the holding element is represented by way of a screw 34 which is screwed with the thread 42 into the threaded bore 38.

The invention has provided a longitudinally adjustable steering column with an energy absorption apparatus which is of simple construction and in the case of which the breaking force which is required in the case of a crash for activating the energy absorption apparatus can be set satisfactorily in terms of the construction.

What is claimed is:

1. An adjustable steering column for a motor vehicle, the adjustable steering column comprising:
   an actuating unit for mounting a steering shaft rotatably about a longitudinal axis;
   a carrying unit in which the actuating unit is mounted so as to be displaceable axially in a direction of the longitudinal axis by way of a motorized longitudinal adjustment drive that is disposed on the carrying unit;
   a transmission device that is coupled on a first side to the actuating unit and on a second side to the longitudinal adjustment drive;
   an energy absorption apparatus configured to absorb energy upon displacement of the actuating unit relative to the transmission device; and
   a coupling device connected to the actuating unit and to the transmission device, wherein the coupling device is configured to disconnect from at least one of the actuating unit or the transmission device in a crash event where a force that exceeds a predefined value acts on the steering shaft in the direction of the longitudinal axis, which permits movement between the actuating unit and the transmission device, wherein the coupling device comprises a pin-shaped holding element that protrudes into a slot, wherein a blocking element blocks movement of the pin-shaped holding element in the slot, wherein in a crash event the blocking element permits movement of the pin-shaped holding element in the slot, wherein the blocking element comprises a plastic bar that extends transversely over the slot and is anchored in two lateral recesses of walls of the slot, wherein the two lateral recesses are disposed to lie opposite one another.

2. The adjustable steering column of claim 1 wherein the pin-shaped holding element is configured as a rivet or a screw.

3. The adjustable steering column of claim 2 wherein the actuating unit includes, respectively, a bore for fastening the rivet or a threaded bore for screwing in the screw.

4. The adjustable steering column of claim 1 wherein the plastic bar is press-fit in the two lateral recesses of the walls of the slot.

5. The adjustable steering column of claim 1 wherein in a crash event the coupling device is disconnected from the actuating unit, wherein the energy absorption apparatus includes a first bending wire, wherein a first end of the first bending wire is connected to the actuating unit and a second end of the first bending wire is connected to the coupling device.

6. An adjustable steering column comprising:
an actuating unit for mounting a steering shaft rotatably about a longitudinal axis;
a carrying unit in which the actuating unit is mounted so as to be displaceable axially in a direction of the longitudinal axis by way of a motorized longitudinal adjustment drive that is disposed on the carrying unit
a transmission device that is coupled on a first side to the actuating unit and on a second side to the longitudinal adjustment drive;
an energy absorption apparatus configured to absorb energy upon displacement of the actuating unit relative to the transmission device; and
a coupling device connected to the actuating unit and to the transmission device, wherein the coupling device is configured to disconnect from at least one of the actuating unit or the transmission device in a crash event where a force that exceeds a predefined value acts on the steering shaft in the direction of the longitudinal axis, which permits movement between the actuating unit and the transmission device, wherein the coupling device comprises a pin-shaped holding element that protrudes into a slot, wherein a blocking element blocks movement of the pin-shaped holding element in the slot, wherein in a crash event the blocking element permits movement of the pin-shaped holding element in the slot,
wherein in a crash event the coupling device is disconnected from the actuating unit, wherein the energy absorption apparatus includes a first bending wire, wherein a first end of the first bending wire is connected to the actuating unit and a second end of the first bending wire is connected to the coupling device,
wherein the energy absorption apparatus comprises a second bending wire, wherein a first end of the second bending wire is connected to the actuating unit and a second end of the second bending wire is connected to the coupling device via a switching connection that is releasable by way of a pyrotechnical switch.

7. The adjustable steering column of claim 6 wherein the pin-shaped holding element is configured as a rivet or a screw.

8. The adjustable steering column of claim 7 wherein the actuating unit includes, respectively, a bore for fastening the rivet or a threaded bore for screwing in the screw.

9. The adjustable steering column of claim 6 wherein the blocking element is configured as a projection of the coupling element of the coupling device, wherein the projection protrudes into the slot.

10. The adjustable steering column of claim 9 wherein the projection is a punched-out, bent-over section of the coupling element, wherein the punched-out, bent-over section delimits the slot.

11. An adjustable steering column comprising:
an actuating unit for mounting a steering shaft rotatably about a longitudinal axis;
a carrying unit in which the actuating unit is mounted so as to be displaceable axially in a direction of the longitudinal axis by way of a motorized longitudinal adjustment drive that is disposed on the carrying unit
a transmission device that is coupled on a first side to the actuating unit and on a second side to the longitudinal adjustment drive;
an energy absorption apparatus configured to absorb energy upon displacement of the actuating unit relative to the transmission device; and
a coupling device connected to the actuating unit and to the transmission device, wherein the coupling device is configured to disconnect from at least one of the actuating unit or the transmission device in a crash event where a force that exceeds a predefined value acts on the steering shaft in the direction of the longitudinal axis, which permits movement between the actuating unit and the transmission device, wherein the coupling device comprises a pin-shaped holding element that protrudes into a slot, wherein a blocking element blocks movement of the pin-shaped holding element in the slot, wherein in a crash event the blocking element permits movement of the pin-shaped holding element in the slot,
wherein the longitudinal adjustment drive has a spindle drive with a spindle nut that is displaceable axially on a spindle, wherein the transmission device is connected to the spindle nut, wherein the transmission device and a coupling element of the coupling device are configured as a single-piece integral component.

12. The adjustable steering column of claim 11 wherein the pin-shaped holding element is configured as a rivet or a screw.

13. The adjustable steering column of claim 12 wherein the actuating unit includes, respectively, a bore for fastening the rivet or a threaded bore for screwing in the screw.

14. The adjustable steering column of claim 11 wherein the blocking element is configured as a projection of the coupling element of the coupling device, wherein the projection protrudes into the slot.

15. The adjustable steering column of claim 14 wherein the projection is a punched-out, bent-over section of the coupling element, wherein the punched-out, bent-over section delimits the slot.

16. The adjustable steering column of claim 11 wherein in a crash event the coupling device is disconnected from the actuating unit, wherein the energy absorption apparatus includes a first bending wire, wherein a first end of the first bending wire is connected to the actuating unit and a second end of the first bending wire is connected to the coupling device.

* * * * *